US005428953A

United States Patent [19]

[11] Patent Number: 5,428,953

[45] Date of Patent: Jul. 4, 1995

Siga et al.

[54] COMBINED CYCLE GAS TURBINE WITH HIGH TEMPERATURE ALLOY, MONOLITHIC COMPRESSOR ROTOR

[75] Inventors: Masao Siga; Hajime Toriya; Yutaka Fukui, all of Hitachi, Japan

[73] Assignee: Hitachi, Ltd.

[21] Appl. No.: 275,675

[22] Filed: Jul. 15, 1994

Related U.S. Application Data

[62] Division of Ser. No. 102,739, Jul. 15, 1994, Pat. No. 5,360,318.

[30] Foreign Application Priority Data

Aug. 6, 1992 [JP] Japan .................................. 4-210050

[51] Int. Cl.[6] .................................................. F02C 6/00

[52] U.S. Cl. ...................................... 60/39.182; 60/909

[58] Field of Search .................. 60/39.182, 909, 39.19; 416/241 R, 215; 415/200, 216.1

[56] References Cited

U.S. PATENT DOCUMENTS

| | | | |
|---|---|---|---|
| 4,272,953 | 6/1981 | Rice | 60/39.182 |
| 4,850,187 | 7/1989 | Siga et al. | 60/909 |
| 4,896,499 | 1/1990 | Rice | 60/39.182 |
| 5,008,072 | 4/1991 | Siga et al. | 416/241 R |
| 5,201,791 | 4/1993 | Clark et al. | 416/241 R |
| 5,212,941 | 5/1993 | Croonenbrock et al. | 60/39.182 |
| 5,360,318 | 11/1994 | Siga et al. | 415/216.1 |
| 5,370,497 | 12/1994 | Doi et al. | 415/200 |

FOREIGN PATENT DOCUMENTS

| | | | |
|---|---|---|---|
| 171856 | 7/1988 | Japan | 60/909 |
| 101143 | 4/1990 | Japan | 60/909 |

*Primary Examiner*—Timothy S. Thorpe

*Attorney, Agent, or Firm*—Antonelli, Terry, Stout & Kraus

[57] ABSTRACT

A high-temperature gas turbine includes a compressor, and a turbine coupled to the compressor, the turbine being capable of rotating at a high speed by a gas of firing temperature generated by a combustor. The compressor includes a combined type rotor shaft and blades of at least 15 stages which are implanted in the combined type rotor shaft. The compressor compresses air to a temperature of 400° C. or above. The combined type rotor shaft is made of Ni—Cr—Mo—V low alloy steel having all bainitic microstructure whose composition consists, as analyzed in weight percent, of 0.15–0.40% C, 0.1% or less Si, 0.5% or less Mn, 1.5–2.5% Ni, 0.8–2.5% Cr, 0.8–2.0% Mo, 0.1–0.35% V and the balance substantially of Fe.

8 Claims, 6 Drawing Sheets

COMBINED CYCLE GAS TURBINE WITH HIGH TEMPERATURE ALLOY, MONOLITHIC COMPRESSOR ROTOR

This is a division of application Ser. No. 102,739 filed Jul. 15, 1994 now U.S. Pat. No. 5,360,318.

BACKGROUND OF THE INVENTION

1. Field of the Invention

The present invention relates to a high-temperature gas turbine, a compressor for the high-temperature gas turbine, a rotor shaft for the compressor and a heat-resistant steel for the rotor shaft.

2. Description of Related Art

In a compressor rotor for a conventional large-size high-temperature gas turbine, disks (seventeen stages) are fixed thereon by bolts, as disclosed in, for example, Publications of Japanese Laid-Open Patent Applications shot 63-171856 and hei 2-101143. The disks from a first stage to a twelfth stage at a rotor air inlet (low temperature) side are made of a 3% Ni—Cr—Mo—V low alloy steel, while the disks from a thirteenth stage to a sixteenth stage at a rotor air outlet (high temperature) side are made of a Cr—Mo—V low alloy steel having a high strength in high-temperature. The disk of a last stage is made of martensitic steel. This divided rotor type compressor suffers from problems that a manufacture thereof requires too many hours and a rupture readily occurs.

Mitsubishi Juko Technical Report, Vol. 27, No. 1 (1990-1) describes another gas turbine compressor with a monolithic rotor shaft.

The disk type gas turbine rotors disclosed in Publications of Japanese Laid-Open Patent Applications shou-63-171856 and hei-2-101143 have disadvantages that a manufacture thereof requires too many hours, the bolts are loosened due to creep thereof when a temperature of the compressor is high and thus must be re-tightened with a troublesome work to avoid vibrations, and a replacement of a broken blade is troublesome.

In recent years, there is a tendency as a capacity of gas turbine increases and thus the temperature of gas turbine increases.

The compressor rotor for a large-size high-temperature gas turbine is rotated at a high speed in a wide temperature range between a room temperature and 500° C. Hence, the monolithic rotor must be made of a material whose room temperature tensile strength ≧85 kg/mm$^2$, fracture appearance transition temperature ≦20° C. and 475° C., 10$^5$h creep rupture strength under 475° C. and 10$^5$ hours ≧30 kg/mm$^2$. The aforementioned Mitsubishi Juko Technical Report does not describe a rotor material, and the compressor disclosed therein is operated at a low temperature. As a rotor material used at the high temperature, the above-described Ni—Cr—Mo—V steel has a high toughness in a low temperature but a low strength in the high temperature, whereas the above-described Cr—Mo—V steel has a high strength in the high temperature and a low toughness in the low temperature.

SUMMARY OF THE INVENTION

An object of the present invention is to provide a reliable compressor rotor in which a monolithic rotor shaft made of a material exhibiting a high high-temperature strength and a high low-temperature-toughness is used, a reliable gas turbine used in the high temperature for increasing operating efficiency, a compressor for the gas turbine, and a low alloy steel which is used in the rotor shaft.

The present invention provides a high-temperature gas turbine which comprises a compressor, and a turbine coupled to the compressor, the turbine being rotated at a high speed by a combustion gas generated in combustor. The compressor includes a combined type rotor shaft and blades of at least fifteen stages which are implanted in the combined type rotor shaft. A temperature of a compressed gas generated by the compressor reaches 400° C. or thereabove.

The compressor may include a combined type rotor shaft made of Ni—Cr—Mo—V low alloy steel and blades implanted in the rotor shaft. The Ni—Cr—Mo—V low alloy steel has a 50%-fracture-appearance-transition-temperature of 20° C. or therebelow and a creep-rupture-strength-of 30 kg/mm$^2$ or thereabove under 475° C. and 10$^5$ hours. More preferably, the Ni—Cr—Mo—V alloy steel has a tensile strength not less than 85 kg/mm$^2$ at a room temperature, a 0.2% yield strength not less than 72 kg/mm$^2$, an elongation percentage not less than 20%, a contraction percentage not less than 65%, an impact strength not less than 5 kg-m/cm$^2$, a 50%-fracture-appearance-transition temperature not more than 20° C., a creep-rupture-strength not less than 30 kg/mm$^2$ under 10$^5$ hours, and a creep-rupture-strength not less than 37 kg/mm$^2$ under 450° C. and 10$^5$ hours.

The rotor shaft may be made of Ni—Cr—Mo—V type low alloy steel having substantially all bainite microstructure which comprises, in weight percent, 0.15-0.40% C, 0.1% or less (therebelow) Si, 0.5% or less Mn, 1.5-2.5% Ni, 0.8-2.5% Cr, 0.8-2.0% Mo, 0.1-0.35% V and the balance substantially formed by Fe. The low alloy steel may contain 0.01-0.1% of at least one material selected from a group consisting of Nb and Ta.

The compressor may include a combined type rotor shaft made of Ni—Cr—Mo—V type low alloy steel and blades implanted in the rotor shaft. In the rotor shaft, a ratio of a maximum diameter (D) of the rotor shaft to a length (L) between a first stage and a last stage of the blades is 0.40 to 0.55.

The compressor may include at least 15 stages of blades which are implanted in a combined type rotor shaft. All of the blades are implanted in a ring-shaped groove provided over an entire peripheral surface of the rotor shaft.

The compressor may include a combined type rotor shaft and at least fifteen stages of blades which are implanted in the combined type rotor shaft. The blade at a first stage and, if necessary, the blade at at lease one stage between a second stage and a fifth stage are inserted separately or independently into the shaft in an axial direction of the shaft to be implanted therein while the blades from the second stage to a last stage with excluding the above-mentioned inserted blade therefrom are implanted in a ring-shaped groove provided over an entire peripheral surface of the shaft.

The compressor may include a combined type rotor shaft and blades of at least fifteen stages which are implanted in the rotor shaft. A first stage and, if necessary, the blade at at least one stage between a second stage and a fifth stage are made of titanium alloy while the blades from the second stage to a last stage with excluding the before-mentioned blade made of titanium alloy are made of martensitic stainless steel.

The present invention further provides a combined cycle power plane which comprises a gas turbine rotated by a firing gas, a heat recovery steam generator for recovering heat of an exhaust gas discharged from the gas turbine to generate stream, and a steam turbine rotated by the stream, the gas turbine and the steam turbine rotating a generator to generate electric power. The gas turbine includes a compressor. An air is compressed by the compressor with a compression ratio of 15–20 and a temperature of the compressed air is 400° C. or thereabove. A temperature of the firing gas at a combustor outlet is 1400° C. or thereabove. A temperature of the exhaust gas is between 550° and 600° C. The steam turbine has a single casing structure which contains a rotor shaft having a high-pressure rotor and a low-pressure rotor. A temperature of the steam is 530° C. or thereabove, thermal efficiency is 46% or thereabove, and/or a specific power is 600 kW/(kg/S) or thereabove.

The gas turbine may include a compressor having blades of fifteen to twenty stages which are implanted in a combined type rotor shaft. An air is compressed by the compressor with a compression ratio of 15–20 and a temperature of the compressed gas is 400° C. or thereabove. The turbine, rotated by the firing gas, has moving blades of 3 stages. A temperature of the firing gas at a combustor outlet is 1400° C. or thereabove. A temperature of the exhaust gas at an inlet of the heat recovery steam generator is between 550° and 600° C. A temperature of the exhaust gas at an outlet of the heat recovery steam generator is 130° C. or there below. The steam turbine has a single casing structure which contains a rotor shaft having a high-pressure rotor and a low-pressure rotor and blades implanted in the rotor shaft. A blade portion of the blade of a last stage has a size of thirty inches or more. A temperature of the steam at a high-pressure inlet of the steam turbine is 530° C. or more while a temperature at a low-temperature outlet thereof is not more than 100° C.

The present invention further provides a compressor for a gas turbine, having blades implanted in a combined type rotor shaft at multi-stages. The rotor shaft is made of Ni—Cr—Mo—V type low alloy steel having substantially all bainite microstructure and whose composition comprises, in weight percent, 0.15–0.40% C, 0.1% or less Si 0.5% or less Mn, 1.5–2.5% Ni, 0.8–2.5% Cr, 0.8–2.0% Mo, 0.1–0.35% V and the balance formed substantially by Fe.

The present invention further provides a rotor shaft for a gas turbine compressor, which has substantially all bainite microstructure, and which comprises in weight percent, 0.15–0.40% C, 0.1% or less Si, 0.5% or less Mn, 1.5–2.5% Ni, 0.8–2.5% Cr, 0.8–2.0% Mo, 0.1–0.35% V and the balance formed substantially by Fe.

The present invention further provides a heat-resistant steel for a gas turbine compressor rotor, which has substantially all bainite microstructure and substantially comprises, in weight percent, 0.15–0.40% C, 0.1% or less Si, 0.5% or less Mn, 1.5–2.5% Ni, 0.8–2.5% Cr, 0.8–2.0% Mo, 0.1–0.35% V and the balance is formed substantially by Fe.

As compared with a conventional disk-type compressor rotor, since the combined type rotor shaft of the compressor according to the present invention does not require bolting, the temperature of the air can be increased to a higher value, for example, to 400° C., preferably, to a value ranging from 450° to 500° C., thus increasing thermal efficiency by 46% or above. Further, since no creep of bolt occurs, maintenance and inspection can be simplified, and imbalance of rotation can be eliminated, as compared with the conventional disk-type rotor. Further, since a heat-resistant steel having a special alloy composition and exhibiting the characteristics described later is used, blades can be implanted in more than fourteen stages, and a ratio (D/L) of the maximum diameter (D) of the shaft to the length (L) between the first stage to the last stage is between 0.4 and 0.55. That is, the structure similar to that of a conventional disk-type rotor can be obtained. A preferable number of blade stages is more than sixteen with more preferable number being between eighteen and twenty stages. As a result, the compression ratio can be increased to 15 to 20, preferably, to 16 to 18.

The gas turbine compressor having a combined type rotor shaft according to the present invention has no stacking bolts nor bolt holes, unlike the conventional divided type rotor. Thus, the number of manufacturing and assembly hours can be greatly reduced. Further, stress relaxation and loosening of the stacking bolts can be eliminated, and reliability for rupture can thus be greatly improved.

Furthermore, the combined type rotor does not require the manufacturing and assembly hours which would conventionally be required for smelting, forging and machining for seventeen disks.

The combined rotor shaft according to the present invention is classified into four types: one of which is formed as integral or monolithic unit, one of which includes a high-temperature portion formed integrally on a body of the rotor shaft, and a combination of an intermediate-temperature portion and a low-temperature portion as divided disks, the combination connected to the body by the bolts, one of which has a high-temperature portion and an integral combination of an intermediate-temperature portion and a low-temperature portion, the integral combination connected to the high-temperature portion by the bolts, and one of which has the high-temperature portion, the intermediate-temperature portion and the low-temperature portion connected to each other by the bolts.

The combined type rotor shaft for a large-size high-temperature gas turbine compressor according to the present invention is made of Ni—Cr—Mo—V low allow steel because this steel has excellent mechanical properties, particularly, improved bearing characteristics. The rotor shaft made of this low alloy steel has the following composition and a tempered bainite microstructure substantially in whole.

The presence of C improves hardenability and assures sufficient strength. The preferred proportion of C ranges 0.15–0.40% with more preferred being 0.20–0.28%, because the presence of C at 0.15% or below does not ensure sufficient hardenability and hence produces soft ferrite structure around the rotor, thus reducing the tensile strength and deteriorating yield point, and because the inclusion of C at 0.40% or above deteriorates toughness.

Si and Mn act as a deoxidizer. If a steel making technology, such as the vacuum C deoxidation method or the electro slug re-melting method, is used, the addition of Si and Mn is not always necessary to obtain a sound rotor. If Si and Mn are added, however, the proportion thereof muse be reduced to 0.1% or below and 0.5% or below, respectively, from the viewpoint of prevention of temper embrittlement, with preferable proportion (weight percentage) of Si and Mn being 0.05% or below and 0.1%–0.3%, respectively, and more preferable proportion of Mn being between 0.15 and 0.25%.

The presence of Ni is essential to improve hardenability and toughness. The preferable proportion of Ni is equal to or more than 1.5% with more preferable rate being between 1.6% and 2.0%, because less than 1.5% proportion of Ni is not enough to improve toughness and because more than 2.5% proportion of Ni reduces creep rupture strength.

The inclusion of Cr improves hardenability and toughness and impairs the necessary resistance against oxidation in the products at high temperatures. The preferable proportion thereof ranges between 1.2% and 2.2% with more preferable level ranging between 1.8% and 2.2%, because 0.8% or less of Cr does not ensure the above-described effects sufficiently, and because more than 2.50% of Cr reduces creep rupture strength.

The presence of Mo promotes precipitation of fine carbide in the crystal grains during tempering and thus increases high-temperature strength and high-temperature ductility. The addition of Mo is also capable of restricting segregation or precipitation of impurity elements between the grain boundaries during tempering, and thus can prevent temper embrittlement. The preferable proportion thereof is between 1.0% and 1.7%, because less than 0.8% of Mo does not ensure the above-described advantages and because more than 2.0% of Mo makes the above-described advantages of the addition of Mo substantially saturated.

The inclusion of V promotes precipitation of fine carbide in the crystal grains during tempering, and thus improves high-temperature strength and ductility. The preferable proportion of V ranges between 0.21% and 0.28%, because less than 0.10% does not ensure the above-described advantages and because more than 0.35% makes the above-described advantages substantially saturated.

In order to prevent deterioration in the toughness, the proportion of unavoidable impurity elements must be reduced to a sufficiently low value. Particularly, reduction in the proportion of Al greatly improves toughness. The upper limit of Al is set to 0.01% from the viewpoint of the provision of toughness. More preferable proportion of Al is 0.005% or less.

In order to increase the toughness of the Ni—Cr—Mo—V steel, the addition of at least one element selected from a group consisting of Nb and Ta is effective. The preferable proportion of the at least one element selected from a group consisting of Nb and Ta ranges from 0.015% to 0.045%, because less than 0.01% thereof is not enough to obtain a sufficiently improved toughness and because more than 0.1% reduces toughness and high-temperature strength.

The addition of at least one of, rare earth elements or metals of respectively not more than 0.4%, Ca of 0.4% or less, Mg of 0.1% or less, Zr of 0.1% or less, Hf of 0.1% or below and W of 0.1% or less further increases the strength demanded in the products.

The method of manufacturing the combined type rotor shaft for the large-size high-temperature gas turbine compressor according to the present invention will now be described.

After hot forging and diffusion annealing have been performed on an ingot, refining heat treatment is conducted on the ingot. Quenching in the refining heat treatment is performed first by heating the ingot to an austenitizing temperature ranging from 800° to 1000° C. and then by quenching the ingot by air-blast quenching, water spraying or liquid (water or oil). Next, tempering is conducted by heating the ingot to a temperature ranging from 550° to 700° C. In order to obtain high tensile strength and high creep rupture strength, the austenitizing temperature must be 800° C. or above. Heating to a temperature of 1000° C. or above increases the grain size, and thus reduces toughness. Tempering at 550° C. or below does not ensure high toughness, while tempering at 700° C. or above reduces tensile strength and creep rupture strength.

In order to manufacture a more highly reliable combined rotor shaft for a large-size high-temperature gas turbine compressor, heating for hardening may be performed in the refining heat treatment at the rotor air inlet (low-temperature) side with a relatively low temperature, and at the rotor air outlet (high-temperature) side with a relatively high temperature. The desirable hardening heating temperature at the rotor air inlet (low-temperature) side is from 850° to 925° C. from the viewpoint of reduction in the grain size and increase in the toughness, while the desirable hardening heating temperature at the rotor air outlet (high-temperature) side is from 925° to 975° C. from the viewpoint of provision of a high creep rupture strength. After hardening, tempering is conducted at a temperature ranging from 550° to 700°. To repeat tempering twice is desirable from the viewpoint of decomposition of residual austenite and increase in the toughness. Preferably, a heating temperature of a first tempering is 560°–620° C., and that of a subsequent second tempering is higher than that of the first tempering, for example, 600°–670° C. A difference in heating temperature between the first and second tempering is preferably 10°–20° C. at an air inlet side and 40°–60° C. at an air outlet side. The repeat in tempering causes the increases in both tensile strength and impact strength.

In order to manufacture a more reliable combined rotor shaft for a large-size high-temperature gas turbine compressor, the portion of the ingot at the rotor air inlet (low-temperature) side may be made of a steel having a high toughness, whereas, the portion of the ingot at the rotor air outlet (high-temperature) side may be made from a steel having a high high-temperature strength, and the ingot is formed through the electro slug re-melting method. The ingot is subjected to hot forging and diffusion annealing, and then hardening and tempering.

Next, the rotor shaft and blades for the large-size high-temperature gas turbine compressor according to the present invention and a cooling air introduction hole for a gas turbine disk will be described below.

In the combined rotor shaft for the large-size high-temperature gas turbine compressor according to the present invention, a cooling air introducing hole must be provided to cool the gas turbine disks and turbine blades by a compressed air. This cooling air introducing hole may be provided in a flange portion provided in the rotor shaft. The cooling air introducing hole may be provided between the blades of the last stage and the blades of the second last stage beyond the last stage by dividing the rotor shaft into two parts.

In order to make the gas turbine compressor highly reliable, the rotor blades of long blade length between the first stage and the fifth stage are made of titanium alloy having a high specific strength, while the rotor blades from the sixth stage to the last stage are made of 12Cr-type alloy steel.

The blades of the combined rotor shaft for the large-size high-temperature gas turbine compressor may be shaped such that a hook length (L) is not more than a half of pitch (P) of the blades.

The compressor rotor shaft may also be made of a tempered-substantially-in-whole martensitic steel whose composition comprises, in weight percent, 0.05–0.2%, more preferably 0.07–0.15% C., 0.1% or less Si or no Si added, 0.4% or less, more preferably 0.1–0.25% Mn, 2–3%, more preferably 2.3–2.7% Ni, 8–13%, more preferably 11–12.5% Cr, 1.5–3%, more preferably 1.8–2.5% Mo, 0.1–0.3%, more preferably 0.15–0.25% V, 0.02–0.2%, more preferably 0.04–0.08% Ta, 0.02–0.2%, more preferably 0.04–0.08% Nb, 0.03–0.1%, more preferably 0.04–0.08% N and the balance substantially of Fe. This martensitic steel may comprises at least one element selected from a group consisting of 0.5% or less Co, 0.5% or less W, 0.01% or less B, 0.1% or less Al, 0.3% or less Ti 0.1% or less Zr, 0.1% or less Hf, 0.01% or less Ca 0.01% or less Mg, 0.01% or less Y and 0.01% or less rare earth element or metal. Although such materials have high high-temperature strength and toughness and can thus be used as rotor shaft materials sufficiently, they have low wear characteristics. Hence an additional steel having bainite microstructure with 0.1–0.3% C, 1% or less Si, 2% or less Mn and 0.5–3% Cr, or another additional steel with 1% or less Mo and 0.3% or less V in addition to the composition of the before-mentioned additional steel may be applied to a bearing journal portion of the rotor shaft with a sleeve or multi-layers shape thereon. The multi-layers may be formed through a plurality of cladding steps by welding.

To form the compressor blades, 12% Cr martensitic steel and titanium alloy are usable. The martensitic steel is used to form the moving blades and the stationary blades except for those made of titanium alloy. The martensitic steel is malleable, whose composition comprises 0.1–0.2% C, 0.3% or less Si, 1% or less Mn, 9–13% Cr, 0.5–2% Mo, 0.05–0.2% V and the balance substantially of Fe. Titanium alloy is used to form the blade of the first stage and/or at least one of the blades from the second to fifth stages when necessary. The composition of titanium alloy comprises 0.05% or less C, 3–6% V, 5–8% of Al, 1% or less Fe, and the balance substantially of Ti. Particularly, a blade whose distal end is wider than the implanted portion is desirable because it improves a compression efficiency. The blade made of titanium alloy may be constructed such that the distal end thereof is narrower than the implanted portion thereof or such that the distal end thereof is wider than the implanted portion thereof. The latter structure is used for the blades of the first, second and third stages, and is desirable from the viewpoint of efficiency.

In addition to the compressor rotor shaft, at least one of components including a distant piece, a turbine spacer, a turbine stacking bolt, a compressor stacking bolt and compressor disks of the last stage may be made of a heat-resistant steel having a tempered-substantially-in-whole martensitic structure whose composition comprises, in weight percent, 0.05–0.2% C, 0.5 or less Si, 1% or less Mn, 8–13% Cr, 3% or less Ni, 1.5–3% Mo, 0.05–0.3% V, 0.02–0.2% Nb, 0.02–0.1% N and the balance substantially of Fe. The use of such a heat-resistant steel for all those components ensures a high gas temperature, and improves heat efficiency. Particularly, a highly safe gas turbine exhibiting high embrittlement resistance can be obtained when at least one of the above-mentioned components is made of a heat-resistant steel having tempered-substantially-in-whole martensitic structure, comprises, in weight percent, 0.05–0.2% C, 0.5% or less Si, 0.6 or less Mn, 8–13% Cr, 2–3% Ni, 1.5–3% Mo, 0.05–0.3% V, 0.02–0.2% Nb, 0.02–0.1% N and the balance substantially of Fe, and having (Mn/Ni) ratio of 0.11 or less, more preferably 0.04–0.10.

A martensitic steel having creep rupture strength of 40 kg/mm$^2$ or thereabove under 450° C. for $10^5$ hours and V notch Charpy impact value at 20° C. of 5 kg-m/cm$^2$ or thereabove is used as the material for the above-described components. Preferably, a martensitic steel has creep rupture strength of 50 kg/mm$^2$ or above under 450° C. for $10^5$ hours, V notch Charpy impact value thereof at 20° C. obtained after being heated for $10^5$ hours at 500° C. is not less than 5 kg-m/cm$^2$.

The above martensitic steel may contain at least one of 1% or less W, 0.5% or less Co, 0.5% or less Cu, 0.01% or less B, 0.5% or less Ti, 0.3% or less Al, 0.1% or less Zr, 0.1% or less Hf, 0.01% or less Ca, 0.01% or less Mg, 0.01% or less Y and 0.01% or less rear earth element or metal.

Regarding the diaphragm for fixing turbine nozzles, a portion thereof corresponding to the turbine nozzle of the first stage is made of a material whose composition comprises, in weight percent, 0.05% or less C, 1% or less Si, 2% or less Mn, 16–22% Cr, 8–15% Ni and the balance substantially of Fe, while another portion thereof corresponding to the turbine nozzles of other stages is made of a high C and high Ni type casting steel.

The turbine blade is made of a cast alloy whose composition comprises, in weight percent, 0.07–0.25% C, 1% or less Si, 1% or less Mn, 12–20% Cr, 5–15% Co, 1.0–5.0% Mo, 1.0–5.0% W, 0.005–0.03% B, 2.0–7.0% Ti, 3.0–7.0% Al, at least one of 1.5% or less Nb, 0.01–0.5% Zr, 0.01 –0.5% Hf and 0.01–0.5% V, and the balance substantially of Ni, and in which $\gamma'$ phase and $\gamma''$ phase are precipitated in the austenitic phase base. For an improved turbine blade used an a more high temperature, a single crystal alloy in which 5% or less Re is further added to the above-mentioned components, a dispersed alloy in which $Y_2O_3$ grains of 0.1 or less $\mu$m diameter are uniformly dispersed by 1 or less weight percent, or a unidirectionally solidified alloy is used.

Ni base super alloy, which will be described in detail later, is used to form the gas turbine nozzle at at least a first stage thereof. It may be used to form the gas turbine nozzles at all the stages thereof. The gas turbine nozzle may be made, at the stages other than the first stage, of a cast alloy whose composition comprises, in weight percent, 0.20–0.60% C, 2% or less Si, 2% or less Mn, 25–35% Cr, 5–15% Ni, 3–10% W, 0.003–0.03% B and the balance substantially of Co. The cast alloy may comprises in addition to the aforementioned components, at least one of 0.1–0.3% Ti, 0.1–0.5% Nb and 0.1–0.3% Zr, and include eutectic carbide and secondary carbide in the austenitic phase base. To obtain such alloys, aging treatment is performed after solution heat treatment, and then the aforementioned precipitates are formed to reinforce the alloy.

The gas turbine nozzle at the first stage may be made of Ni base super alloy which has 900° C., 14 kg/mm$^2$ rupture strength of 300 h or above and a crack generation resistance of 600 times or above at 900° C. and 350° C. and which can be welded at a preheating temperature of 400° C. or above, has a single blade portion and side walls formed at respective sides of the blade portion, and are disposed in a ring-like shape on the outer periphery of the rotatable blade. The Ni base super alloy for the gas turbine nozzle at the first stage may include, in weight percent, 0.05–0.20% C, 15–25% Co, 15–25% Cr, 1.0–3.0% Al, 1.0–3.0% Ti, 1.0–3.0% Nb, 5–10% W and 55% or more Ni, and a total weight percent of (Al+Ti) and the weight percent of W may be within an area defined by lines connecting sequentially points represented by A (Al+Ti 2.5%, W 10%), B (Al+Ti 3%, W 10%), C (Al+Ti 5%, W 7.5%), D (Al+Ti 5%, W 5%), E (Al+Ti 3.5%, W 5%) and F (Al+Ti 2.5%, W 7.5%).

A Ni base alloy having 900° C., 14 kg/mm2 rupture time of 300 h or above is used for the turbine nozzle, and a preheating temperature thereof which ensures that no crack is generated in a bead having a length of 80 mm and a width of 8 mm and formed by one pass TIG welding at 400° C. or below.

In the gas turbine according to the present invention, the length between the side walls formed at the respective sides of the blade portion of the nozzle is 70 mm or above, and a length from the fire gas inlet side to the fire gas outlet side is 100 mm or above.

Furthermore, in order to prevent corrosion of the turbine blade due to a high-temperature firing gas, Al, Cr or (Al+Cr) diffusion coating may be applied thereto with a coating thickness of 30–150 μm. The coating is preferably performed on a portion of turbine blade exposed to the firing gas. Such the diffusion coating may be replaced by a combination of a vapor or plasma spraying of Ni or Fe alloy containing 10–30% Cr, 5–10% Al and 1% or less Y, and another subsequent vapor or plasma spraying of stabilizing $ZrO_2$ to form a heat insulating layer thereof on the Ni or Fe alloy.

The plurality of combustors are provided around the turbine. The combustor has a double structure of an outer cylinder and an inner cylinder. The inner cylinder is formed by welding a plastically workable material having a thickness of 2 to 5 mm and comprising, in weight percent, 0.05–0.2 C, 2% or less Si, 2% or less Mn, 20–25% Cr, 0.5–5% Co, 5–15% Mo, 10–30% Fe, 5% or less W, 0.02% or less B and the balance substantially of Ni. A crescent-shaped louver hole is provided to supply air over the entire periphery of the cylinder. A heat solution treated material having a substantially entire austenitic structure is used. A transition piece for choking the firing gas is provided beyond the combustor. The above-described material is used to form the transition piece.

The steam turbine according to the present invention includes a combined type or monolithic rotor shaft in which multi stages of blades are implanted from the high-pressure side to the low-pressure side, and a casing which covers the rotor. The combined-type rotor shaft is made of a heat-resistant low alloy steel of Ni—Cr—Mo—V type having bainite microstructure. The rotor shaft is formed as a single shaft which extends from the high-pressure side at which steam of 538° C. or 566° C. is introduced to the blade of the first stage to the low-pressure side at which steam of 46° C. or below is exhausted from the blade of the last stage.

The rotor shaft may be made of a heat-resistant low alloy steel of Ni—Cr—Mo—V type having bainite microstructure. The rotor shaft is formed as a single or monolithic shaft which extends from the high-pressure side at which steam of 530° C. is introduced to the blade of the first stage to the low-pressure side at which steam of 100° C. or below is exhausted from the blade of the last stage. The blade of the last stage has a length of 33.5 or 40 inches. The blades from the first stage to another stage having a blade length of 33.5 inches are made of martensitic steel containing 10–13% Cr. The blade having a length of forty inches is made of Ti base alloy.

The steam turbine according to the present invention may be of a single flow non-reheating type whose steam temperature is 530° C. or above, in which steam of 100° C. is discharged from the low-pressure side and in which steam flows in one direction from the high-pressure side to the low-pressure side, or of a reheating type in which the steam which is heated to the same temperature as that of the high-pressure side is caused to flow into the intermediate pressure side. The steam turbine may have preferably moving blades of ten stages or more. The desirable length of the blade portion of the last stage is preferably thirty inches or above.

DETAILED DESCRIPTION OF THE PREFERRED EMBODIMENTS

EXAMPLE 1

Table 1 shows the chemical composition (weight percent) of the currently available disk materials and those of the combined rotor shafts according to the present invention. These samples were obtained by performing hot forging on the ingot melted by a high-frequency melting furnace. Comparative examples Nos. 1 and 2 are ASTM standard materials which are extensively used as the disk material. No. 1 is a Cr—Mo—V steel conforming to ASTM standard A470 Class 8, and No. 2 is a Ni—Cr—Mo—V steel conforming to ASTM standard A470 Class 7. Nos. 3 and 4 are Cr—Ni—Mo—V steels which are applied to the combined-type rotor shaft according to the present invention. Hardening and tempering corresponding to the central portion of the rotor, shows in Table 2, were conducted on these samples.

TABLE 1

| Sample No. | C | Si | Mn | Ni | Cr | Mo | V | Others |
|---|---|---|---|---|---|---|---|---|
| | Composition (wt. %) | | | | | | | |
| 1 | 0.27 | 0.25 | 0.72 | 0.42 | 1.15 | 1.20 | 0.23 | |
| 2 | 0.25 | 0.03 | 0.04 | 3.65 | 1.74 | 0.40 | 0.12 | |
| 3 | 0.23 | 0.03 | 0.20 | 1.85 | 2.05 | 1.38 | 0.25 | |
| 4 | 0.23 | 0.03 | 0.18 | 1.80 | 2.00 | 1.35 | 0.25 | Nb 0.02 |

TABLE 2

| | Hardening | Tempering | | |
|---|---|---|---|---|
| No. 1 | 975° C. × 3 h | Primary: | 650° C. × 25 h | Furnace cooling |
| | 100° C./h Cooling speed | Secondary: | 660° C. × 25 h | Furnace cooling |
| No. 2 | 850° C. × 3 h | Primary: | 590° C. × 25 h | Furnace cooling |
| | 100° C./h Cooling speed | Secondary: | 605° C. × 25 h | Furnace cooling |
| No. 3 | 940° C. × 3 h | Primary: | 590° C. × 25 h | Furnace cooling |
| No. 4 | 100° C./h Cooling speed | Secondary: | 640° C. × 25 h | Furnace cooling |

Figure 3:
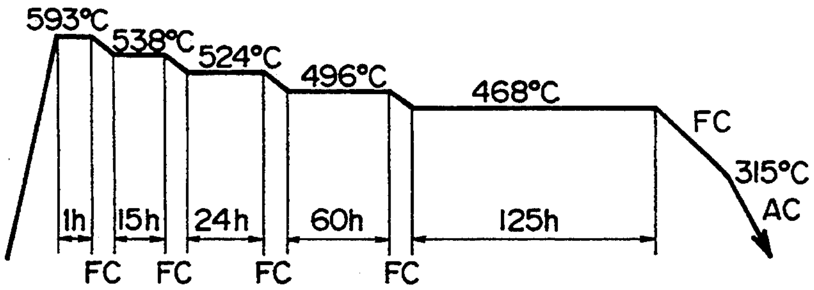
FIG. 3 is a graphical illustration of heat treatment profile of the step cool method.

Table 3 shows the mechanical properties of the currently available rotor materials and the compressor combined rotor shaft materials. Room temperature tensile test, V notch Charpy impact test and creep rupture test were conducted according to the JIS test methods. Impact test was conducted after step-cooling embrittlement, shown in FIG. 3, which was a simulation of high-temperature long-time embrittlement.

Figure 1:
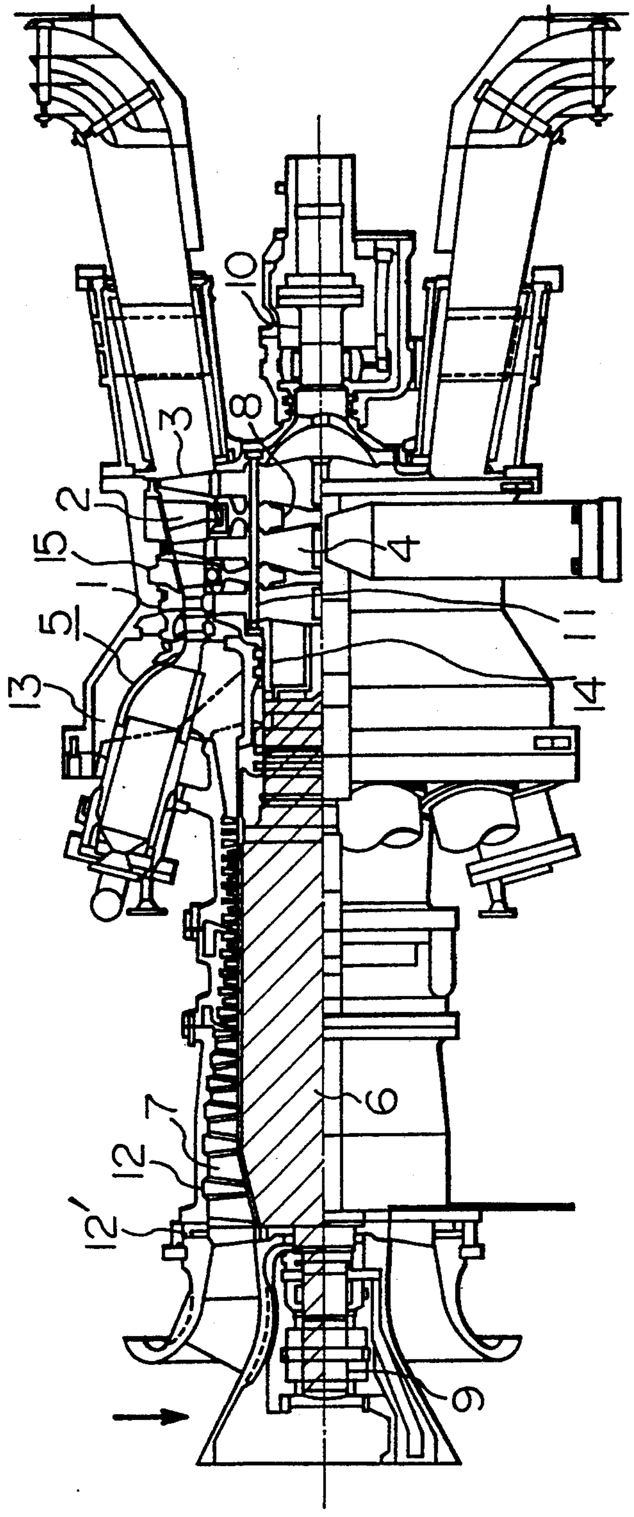
FIG. 1 is a cross-sectional view of part of a gas turbine according to the present invention.

As shown in FIG. 1, a gas turbine having a compressor according to the present invention includes a turbine tub shaft 10, a turbine bucket 3, a turbine stacking bolt 11, a turbine spacer 8, a distant piece 14, a nozzle 2, a compressor rotor shaft 6, a compressor blade 7, a compressor tub shaft 9, a turbine disk 4 and a hole 11. The gas turbine according to the present invention has compressor blades in seven of seventeen stages and turbine buckets three of three stages.

The gas turbine of this example is of heavy duty and single shaft type having a horizontally divided casing and a stacking rotor. The compressor is of seventeen stage axial flow type, and the turbine is of three stage impulse type. The stationary and moving blades are cooled by air in a single or two stages. The combustor is of berth flow type having sixteen chambers and employing the slot cool method.

The compressor rotor was manufactured from an alloy steel having a composition shown in Table 4.

TABLE 4

| | | | | | (wt. %) |
|---|---|---|---|---|---|
| C | Si | Mn | P | S | Ni |
| 0.24 | 0.02 | 0.20 | 0.004 | 0.003 | 1.78 |
| Cr | Mo | V | $O_2$ | Fe | |
| 2.05 | 1.20 | 0.27 | 0.0015 | Balance | |

Melting of the alloy steel was performed by a basic electric furnace. Refining was performed by a ladle. To obtain an ingot, both vacuum pouring and vacuum carbon deoxidation were performed. Next, casting was performed in a hot state (from 850° C. to 1200° C.) by a hydraulic press to obtain predetermined dimensions. The diameter of the rotor was 1300 mm, and the length thereof was 6000 mm. In the heat refining process, hardening was performed first by heating to 950° C. and then by water-spray quenching, and then tempering was conducted twice at 630° C. and 645° C. Table 5 shows the mechanical properties of the respective portions of the rotor. As shown in Table 5, the tensile strength of the respective portions was 88 kg/mm$^2$ or above and the impact absorbing energy thereof was 4.4 kg-m or above. The rotor was not embrittled. These prove that the rotor of this example has excellent properties.

Thus, the rotor shaft of this example can be used as the rotor for a gas turbine compressor.

The rotor shaft 6 of this example is a combined type rotor which extends from the stub shaft 9 to the distant piece 14. It has no central hole. The central hole may be formed in order to examine the mechanical properties.

TABLE 3

| Sample No. | Tensile strength (kg/mm$^2$) | 0.2% Yield point (kg/mm$^2$) | Elongation (%) | Reduction of area (%) | Impact value kg-m/cm$^2$ | Fatt (°C.) | $10^5$ hours Strength (kg/mm$^2$) 450° C. | 475° C. |
|---|---|---|---|---|---|---|---|---|
| 1 | 88.1 | 75.2 | 19.0 | 54.1 | 1.1 | 129 | 37 | 31.5 |
| 2 | 88.5 | 76.5 | 21.8 | 67.9 | 21.6 | −38 | 31 | 25 |
| 3 | 89.1 | 76.8 | 20.2 | 70.0 | 15.4 | 5 | 42 | 35 |
| 4 | 88.2 | 76.0 | 21.3 | 71.2 | 17.5 | −2 | 40.5 | 33.5 |

The creep rupture strength was obtained by Larson-Miller method. The mechanical properties required for the compressor combined type rotor material are as follows: room temperature tensile strength ≧85 kg/mm2, a fracture appearance transition temperature ≦20° C., and 538° C. $10^5$ h creep rupture strength ≧30 kg/mm$^2$. Although comparative example No. 1 satisfies the above-mentioned room temperature tensile strength and creep rupture strength, it has too high fracture appearance transition temperature and too low low-temperature toughness. Comparative example No. 2 satisfies the above-mentioned room temperature tensile strength and fracture appearance transition temperature but has too low creep rupture strength and too low high-temperature strength.

Samples 3 and 4 satisfy the above-mentioned room temperature tensile strength, fracture appearance transition temperature and creep rupture strength and are thus very useful as the compressor combined type rotor material.

TABLE 5

| | | Tensile strength (kg/mm$^2$) | 0.2% Yield point (kg/mm$^2$) | Elongation (%) | Reduction of area (%) | Impact absorbing energy (kg-m) Before embritted | After* embritted | 50/% Fatt Before embritted | After* embritted | 538° C., $10^5$h Creep rupture strength (kg/mm$^2$) |
|---|---|---|---|---|---|---|---|---|---|---|
| Low pressure portion | Outer layer portion | 88.2 | 70.1 | 21 | 70 | 15.0 | — | −40 | — | — |
| | Central portion | 89.5 | 70.8 | 19 | 60 | 4.6 | 4.4 | 49 | 50 | — |
| High pressure portion | Outer layer portion | 88.3 | 70.1 | 21 | 70 | 16.2 | — | −40 | — | — |
| | Center portion | 88.7 | 70.3 | 20 | 64 | 4.5 | 4.4 | 55 | 55 | 17.2 |

*Heated at 500° C. for 3000 h

Materials shown in Table 6, which are large steels having sizes corresponding to the actual sizes of various components for the gas turbine, were melted by the electro slug re-melting method, and then forged and heat treated. Forging was conducted in a temperature range from 850° to 1150° C. Heat treatment was conducted under the conditions shown in Table 6. Table 6 shows the chemical composition (weight percent) of each of the materials. Regarding the microscopic structure, sample Nos. 5 through 8 all have entire tempered martensitic structure, and sample No. 9 have an entire tempered bainite microstructure. Sample No. 5 was used to form the distant piece and the compressor disk of the last stage. The dimensions of the former were 60 mm (thickness)×500 mm (width)×1000 mm (length). The dimensions of the latter were 1000 mm (diameter) and 180 mm (thickness). Sample No. 6 was used to form a disk having dimensions of 1000 mm (diameter)×180 mm (thickness). Sample No. 7 was used to form a spacer having dimensions of 1000 mm (outer diameter)×400 mm (inner diameter)×100 mm (thickness). Sample No. 8 was used to form a turbine stacking bolt having dimensions of 40 mm (diameter)×500 mm (length) and a bolt which connects the distant piece to the turbine disk. Sample No. 9 was forged to; form a turbine stub shaft having dimensions of 250 mm (diameter)×300 mm (length). Each of samples except for sample No. 8 was taken from the central portion of the material after subjected to heat treatment in a direction perpendicular to an axial (longitudinal) direction thereof.

TABLE 6

| No. | Composition C | Si | Mn | Cr | Ni | Mo | V | Nb | N | Fe | Heat treatment |
|---|---|---|---|---|---|---|---|---|---|---|---|
| 5 (Distant piece) | 0.10 | 0.04 | 0.70 | 11.58 | 1.98 | 1.98 | 0.20 | 0.08 | 0.06 | Balance | 1050° C. × 5 hOQ<br>550° C. × 15 hAC<br>600° C. × 15 hAC |
| 6 (Turbine disk) | 0.10 | 0.05 | 0.65 | 11.49 | 1.70 | 2.04 | 0.19 | 0.08 | 0.06 | " | 1050° C. × 8 hOQ<br>550° C. × 10 hAC<br>600° C. × 10 hAC |
| 7 (Spacer) | 0.12 | 0.04 | 0.20 | 11.1 | 2.70 | 2.05 | 0.20 | 0.07 | 0.05 | " | 1050° C. × 3 hOQ<br>550° C. × 10 hAC<br>600° C. × 10 hAC |
| 8 (Stacking bolt) | 0.10 | 0.03 | 0.69 | 11.94 | 1.86 | 2.25 | 0.21 | 0.15 | 0.05 | " | 1050° C. × 1 hOQ<br>550° C. × 25 hAC<br>600° C. × 2 hAC |
| 9 (CrMo steel) | 0.26 | 0.25 | 0.79 | 1.09 | 0.41 | 1.25 | 0.23 | — | — | " | 975° C. × 8 hWQ<br>665° C. × 25 hAC<br>665° C. × 25 hAC |

OQ: Oil quenching
AC: Air cooling
WQ: Water quenching

Table 7 shows the room temperature tensile strength, the 20° C. V notch Charpy impact value and the creep rupture strength of sample No. 5 through 9. The creep rupture strength was obtained by the normally used Larson-Miller method.

Sample Nos. 5 through 8 of the present invention (12% Cr steel) have 450° C., 105 h creep rupture strength of 15 kg/mm2 or above and 20° C. V notch Charpy impact value of 7 kg-m/cm$^2$ or above, and can thus satisfy the strengths required for the high-temperature gas turbine materials.

TABLE 7

| No. | Tensile strength (kg/mm$^2$) | 0.02% Yield point (kg/mm$^2$) | Elongation (%) | Reduction of area (%) | Impact value $vE_{20}$ (kg-m/cm$^2$) | $10^5$ hours Creep rupture strength at 450° C. (kg/mm$^2$) |
|---|---|---|---|---|---|---|
| 5 | 112.0 | 79.3 | 19.8 | 60.1 | 8.7 | 51.1 |
| 6 | 111.7 | 79.5 | 20.1 | 59.3 | 8.3 | 52.3 |
| 7 | 114.3 | 81.2 | 19.5 | 62.5 | 7.2 | 51.3 |
| 8 | 115.7 | 82.6 | 22.3 | 63.4 | 8.7 | 52.7 |
| 9 | 86.4 | — | 26.7 | 68.8 | 7.5 | 35.2 |

Although sample No. 9 (low alloy steel) for a stub shaft has a low 450° C. creep rupture strength, it has a tensile strength of 86 kg/mm2 or above and a 20° C. V notch Charpy impact value of 7 kg-m/$cm^2$ or above, i.e., it has strengths required for a stub shaft (tensile strength ≧81 kg/$mm^2$ and 20° C. V notch Charpy impact value ≧5 kg-m/$cm^2$).

The temperature of the distant piece and that of the compressor rotor shaft portion of the last stage, manufactured under the above-described conditions, are 450° C. at a maximum The desirable thickness of the distant piece is between 25 and 30 mm. The turbine disk has a central through-hole. A compressive residual stress is applied to the through-hole of the turbine disk.

There are three stages of turbine disks 10. The turbine disks of the first and second stages located on the upstream side of the gas have a central hole 11. The alloys listed in Table 8 were used to form a turbine blade 3, a turbine nozzle 14, a liner 13 of a combustor 5, a compressor blade 7, a compressor nozzle 12, a diaphragm 15 and a shroud 1. Particularly, the turbine nozzle 2 and the turbine blade 3 were formed by casting.

A shroud segment (1) in Table 8 is used for the first stage located on the upstream side of the gas, and shroud segment (2) is used for both the second and third stages.

TABLE 8

| | C | Si | Mn | Cr | Ni | Co | Fe | Mo | B | W | Ti | Others |
|---|---|---|---|---|---|---|---|---|---|---|---|---|
| Turbine blade | 0.15 | 0.10 | 0.12 | 15.00 | Balance | 9.02 | — | 3.15 | 0.015 | 3.55 | 4.12 | Zr 0.15, Al 5.00 |
| Turbine nozzle | 0.10 | — | — | 20.2 | Balance | 21.5 | — | — | 0.007 | 7.55 | 2.32 | Al 1.18, Ta 0.98, Nb 0.78 |
| | 0.43 | 0.75 | 0.88 | 29.10 | 10.18 | Balance | — | — | 0.010 | 7.12 | 0.28 | Mo 0.24, Zr 0.15 |
| Combustor liner | 0.07 | 0.88 | 0.75 | 22.13 | Balance | 1.57 | 18.47 | 9.12 | 0.008 | 0.78 | — | — |
| Compressor Blade, nozzle | 0.11 | 0.41 | 0.61 | 12.07 | 0.31 | — | Balance | — | — | — | — | — |
| Shroud segment: | | | | | | | | | | | | |
| (1) | 0.08 | 0.87 | 0.75 | 22.16 | Balance | 1.89 | 18.93 | 9.61 | 0.005 | 0.85 | — | — |
| (2) | 0.41 | 0.65 | 1.00 | 23.55 | 25.63 | — | Balance | — | — | — | 0.25 | Nb 0.33 |
| Diaphragm | 0.025 | 0.81 | 1.79 | 19.85 | 11.00 | — | " | — | — | — | — | — |

A $Y_2O_3$ stabilizing zirconia sprayed layer (or a CVD coating layer) is formed, as a heat-insulating layer, on the high temperature portion of the outer surface of each of the combustor liner 13, the moving blade 3 and the stationary blade 3 which is exposed to flames. In that case, an alloy layer whose composition comprises, in weight percent, of 2–5% Al, 20–30% Cr, 0.1–1% Y and the balance substantially of Ni or (Ni+Co) is formed between the base metal and the coated layer.

Figure 2:
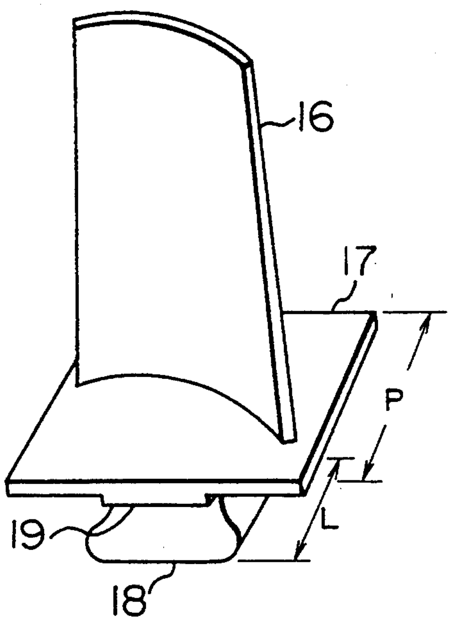
FIG. 2 is a perspective view of a blade for a compressor according to the present invention.

As shown in FIG. 2, with a combined rotor type compressor for a gas turbine, implantation or mounting of the blade is made possible when the length L of the hook of the blade has a relation expressed by L≦P/2 (where P is a pinch of the blades). The blade has a vane portion 16, a platform portion 17 and an implanted portion 18. The platform portion 17 has a protrusion which protrudes toward the implanted portion.

In the case of a large compressor, since the blade located on the air inlet side is subjected to a high centrifugal force, it must be made of a material having a high specific strength. The blade located on the air outlet side is exposed to high temperatures, and thus must be made of a material having a high creep strength.

In this example, the blades from the first to fifth stages were made of Ti-6Al-4V alloy having a low specific gravity and a high tensile strength and shown in Table 9, while the blades from the sixth to seventeenth stages were made of 12Cr heat-resistant steel having a high high-temperature strength, and shown in Table 9.

TABLE 9

| Sample | Composition (wt. %) | | | | | | | |
|---|---|---|---|---|---|---|---|---|
| No. | C | Si | Mn | Ni | Cr | Mo | V | Others |
| 10 | 0.15 | 0.15 | 0.54 | 0.70 | 11.1 | 0.95 | 0.20 | W 0.20, Nb 0.15 N 0.04, Fe Balance |
| 11 | 0.01 | — | — | — | — | — | 4.22 | A 16.60 Fo 0.11, Ti Balance |

The Ti-6Al-4V alloy blade was manufactured by performing annealing at 705° C. after hot forging. To obtain the 12Cr heat-resistant steel blade, oil hardening with heating to 110° C. and tempering at 650° C. were performed after melting and hot forging.

Table 10 shows the mechanical properties of the compressor blades.

A highly reliable compressor can be obtained by using the titanium alloy having a high specific strength for the blades to be located on the air inlet side while by using 12Cr heat-resistant steel having a high creep strength for the blades to be located on the air outlet side.

TABLE 10

| Sample No. | Tensile strength (kg/$mm^2$) | 0.2% Yield point (kg/$mm^2$) | Elongation (%) | Reduction of area (%) | Impact value (kg-m/$cm^2$) | $10^5$ hours Strength (kg/$mm^2$) 450° C. | $10^5$ hours Strength (kg/$mm^2$) 475° C. |
|---|---|---|---|---|---|---|---|
| 10 | 103.7 | 87.0 | 19.6 | 65.9 | 6.2 | 48 | 43 |
| 11 | 102.0 | 95.0 | 18.6 | 46.8 | 3.4 | — | — |

In this example, the same number of ring-shaped grooves as the number of blade stages are formed in the circumferential surface the rotor shaft 6. Each of the grooves has the substantially same cross-sectional shape as that of the implanted portion of the blade 7. Each of the grooves has a hole which allows the implanted portion to be inserted into the groove. The first blade which is first inserted into the respective groove through the hole and the last blade which is finally inserted therein are adjusted such that they do not come off from the groove through the hole. The adjacent blades are in contact with each other at the platform portions thereof to be fixed. A protrusion 19 of the blade is buried in the rotor shaft so that the platform portion is level with the surface of the rotor shaft.

Thus, it is possible to obtain a compression ratio of 15 through 18, a temperature from 400° to 500° C., a compression efficiency of 86% or above, a gas temperature at the turbine nozzle of the first stage of 360° C. or above, an exhaust temperature of 530° C. or above and a heat efficiency of 35% or above. Since the heat-resistant steel having a high creep rupture strength and showing less embrittlement is used to form the turbine disk, the distant piece, the spacer, the compressor rotor shaft and the stacking bolt, since the alloy having a high-temperature strength is used to form the turbine blade, since the alloy having high high-temperature strength and high-temperature ductility is used to form the turbine nozzle, since the alloy having high high-temperature strength and fatigue resistance is used to form the combustor nozzle, a highly reliably and well-balanced gas turbine can be obtained.

Host of the gas turbines have an inter cooler. In a gas turbine having no inter cooler, the temperature of the nozzle increases. The gas turbine according to the present invention is particularly suitably applied to such a non-inter cooler gas turbine. The turbine nozzles are formed for the first stage at 40 points over the entire periphery.

The reliability of the compressor combined type compressor rotor material is further enhanced by performing inclined heat treatment. That is, at an air inlet side used at a relatively low temperature, hardening is performed at a relatively low heating temperature (900° C.) to reduce the grain size of the material and thereby increase the low-temperature toughness. Conversely, at an air outlet side used at a relatively high temperature, hardening is performed at a relatively high heating temperature (950° C.) to increase the high-temperature strength of the material. In the tempering process performed after hardening, tempered bainite microstructure in which there was substantially no residual austenite was obtained substantially in whole of the combined type rotor. To obtain a high low-temperature toughness, tempering was repeated twice.

Table 11 shows the chemical composition of the combined rotor material which is subjected to the inclined heat treatment. Table 12 shows the conditions of the compressor inclined heat treatment. Table 13 shows the mechanical properties of the combined rotor material.

The inclined heat treatment greatly enhances the low-temperature toughness of the air inlet side portion and the high-temperature strength of the air outlet side. It is thus possible to obtain a more reliably combined type rotor.

TABLE 11

| | Composition (Weight %) | | | | | | | |
|---|---|---|---|---|---|---|---|---|
| No. | C | Si | Mn | Ni | Cr | Mo | V | Fe |
| 12 | 0.23 | 0.03 | 0.18 | 1.78 | 2.01 | 1.45 | 0.26 | Balance |

TABLE 12

| | Hardening | Tempering | |
|---|---|---|---|
| Air inlet side (low portion) | 900° C. Water spray cooling corresponding to 100° C./h cooling speed | Primary: | 590° C. Furnace cooling |
| | | Secondary: | 635° C. Furnace cooling |
| Air outlet side (high-temperature portion) | 950° C. Water spray cooling corresponding to 100° C./h cooling speed | Primary: | 590° C. Furnace cooling |
| | | Secondary: | 650° C. Furnace cooling |

TABLE 13

| | Tensile strength ($kg/mm^2$) | 0.2% Yield point ($kg/mm^2$) | Elongation (%) | Reduction of area (%) | Impact value $kg\text{-}m/cm^2$ | Fatt (°C.) | $10^5$ hours Strength ($kg/mm^2$) 450° C. | 475° C. |
|---|---|---|---|---|---|---|---|---|
| Air inlet side (low temperature portion) | 91.2 | 79.1 | 21.3 | 70.5 | 22.5 | −20 | — | — |
| Air outlet side (high-temperature portion) | 91.8 | 80.0 | 20–.3 | 67.9 | 6.3 | 8 | 43.0 | 36.5 |

EXAMPLE 3

The combined-type rotor was obtained by the electro slug re-melting method (hereinafter abbreviated as ESR method) using two types of electrodes.

A material having a high low-temperature toughness was used to form an air inlet side portion of the rotor, and a material having a high high-temperature strength was used to form an air outlet side portion thereof. First, a material of sample No. 14 was melted as the air outlet side portion, and then a material of sample No. 13 was melted as the air inlet side portion to be combined with the air outlet side portion. This combined ingot was hoe forged and then inclination heat treated.

Table 14 shows the chemical composition (weight percent) of the combined rotor material for a compressor obtained by ESR. Table 15 shows the conditions of the heat treatment. Table 16 shows the mechanical properties of the combined rotor material for a compressor obtained by ESR.

The combined rotor material for a compressor obtained by ESR has a very high low-temperature toughness for the air inlet side portion and a very high high-temperature strength for the air outlet side portion, and is thus highly reliable.

TABLE 14

| Sample | Composition (wt. %) | | | | | | | |
|---|---|---|---|---|---|---|---|---|
| No. | C | Si | Mn | Ni | Cr | Mo | V | Fe |
| 13 | 0.25 | 0.03 | 0.05 | 3.71 | 1.75 | 0.38 | 0.12 | Balance |
| 14 | 0.23 | 0.02 | 0.19 | 1.75 | 1.51 | 1.60 | 0.25 | Balance |

TABLE 15

| No. | | Heat treatment condition Hardening | Tempering | |
|---|---|---|---|---|
| 14 | Air inlet side (low-temperature portion) | 850° C. Water spray cooling | Primary: Secondary: | 590° C. Furnace cooling 605° C. Furnace cooling |
| 15 | Air outlet side (High-temperature portion) | 940° C. Water spray cooling | Primary: Secondary: | 590° C. Furnace cooling 640° C. Furnace cooling |

TABLE 16

| | Tensile strength (kg/mm²) | 0.2% Yield point (kg/mm²) | Elongation (%) | Reduction of area (%) | Impact value kg-m/cm² | Fatt (°C.) | $10^5$ hours Strength (kg/mm²) 450° C. | 475° C. |
|---|---|---|---|---|---|---|---|---|
| Air inlet side (low temperature portion) | 88.5 | 74.2 | 21.5 | 86.8 | 21.5 | −35 | — | — |
| Air outlet side (high-temperature portion) | 87.1 | 73.8 | 20.6 | 69.9 | 8.8 | 26 | 43.5 | 37.5 |

EXAMPLE 4

Figure 4:
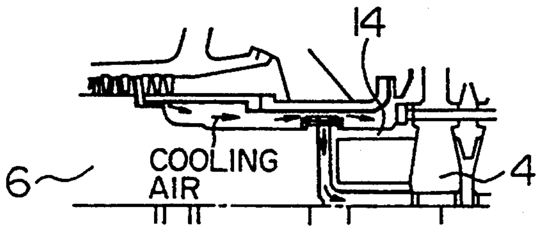
FIG. 4 is a cross-sectional view of an air inlet portion of the compressor according to the present invention.

FIG. 4 is a cross-sectional view illustrating the cooling air introducing method for a gas turbine driven by a compressor with a combined type rotor according to the present invention.

The turbine disk can be cooled by providing a cooling air introducing hole in the flange portion of the shaft. Machining of the cooling air introducing hole in the flange portion is very easy and enables a number of hours required for manufacture to be greatly reduced.

A high-temperature large-size gas turbine compressor of this example has a two-part type rotor. In that case, the cooling air introducing hole is formed in the flange portion of the divided rotor.

Figure 5:
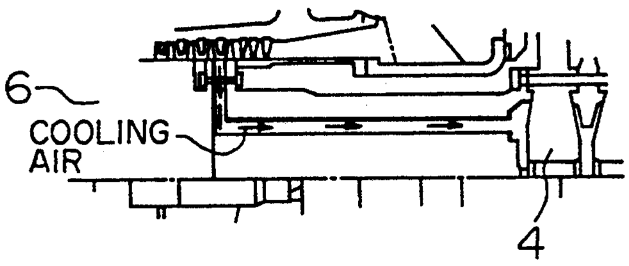
FIG. 5 is a cross-sectional view of a cooling air inlet portion for a gas turbine having a two part compressor rotor constructed in accordance with the present invention.
Figure 6:
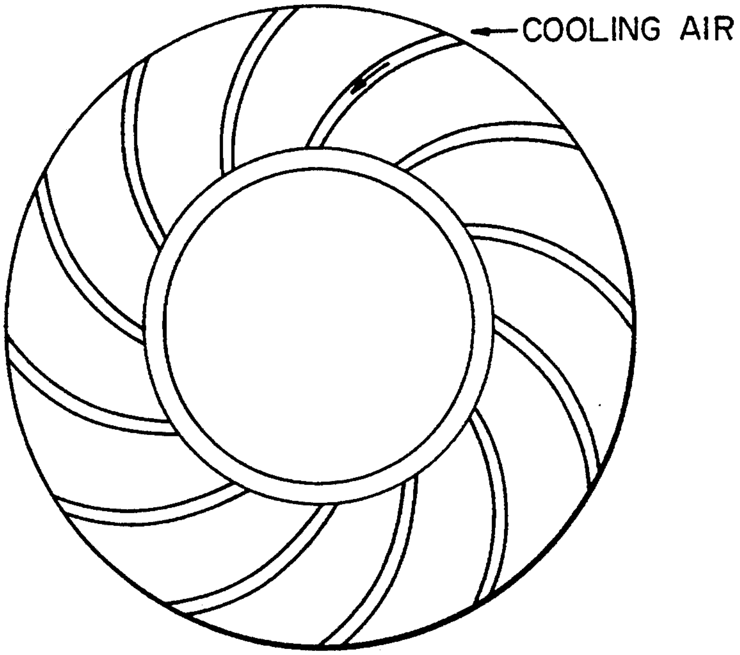
FIG. 6 is a front view of a flange portion showing the air inlet portion of the compressor according to the present invention.

The compressor rotor of FIGS. 5 and 6 is divided into two parts between the blade of the last stage (seventeenth stage) and the blade of the previous stage (sixteenth stage). The two parts are constructed so as to be combined with each other by bolts. The divided position is at the cooling air inlet port, preferably, at one of the compressor's stages whose pressure is higher than that of the cooling air outlet of the turbine. the turbine.

As shown in Table 17, a material of Sample No. 15, which is 3.5 Ni—Cr—Mo—V steel having a high low-temperature toughness, was used for the part of rotor of the air inlet side, and a material of Sample No. 16, which is 1.8 Ni—Cr—Mo—V steel having a high high-temperature strength, was used for the another part of rotor of the air outlet side. Table 18 shows the heat treatment conditions. Table 19 shows the mechanical properties of the two-part rotor materials for a compressor.

According to this example, reliability can be enhanced and the number of man-hours for manufacture can be reduced when compared with the conventional divided type compressor.

TABLE 17

| No. | Composition (wt. %) C | Si | Mn | Ni | Cr | Mo | V | Fe |
|---|---|---|---|---|---|---|---|---|
| 15 | 0.25 | 0.04 | 0.04 | 3.75 | 1.70 | 0.40 | 0.13 | Balance |
| 16 | 0.23 | 0.03 | 0.20 | 1.75 | 1.50 | 1.60 | 0.25 | Balance |

TABLE 18

| No. | | Heat treatment condition Quenching (Hardening) | Tempering | |
|---|---|---|---|---|
| 15 | Air inlet side (low-temperature portion) | 850° C. Water spray cooling | Primary: Secondary: | 590° C. Furnace cooling 605° C. Furnace cooling |
| 16 | Air outlet side (High-temperature portion) | 940° C. Water spray cooling | Primary: Secondary: | 590° C. Furnace cooling 640° C. Furnace cooling |

TABLE 19

| | Tensile strength (kg/mm²) | 0.2% Yield point (kg/mm²) | Elongation (%) | Reduction of area (%) | Impact value kg-m/cm² | Fatt (°C.) | $10^5$ hours Strength (kg/mm²) 450° C. | 475° C. |
|---|---|---|---|---|---|---|---|---|
| Air inlet side (low temperature portion) | 89.1 | 74.8 | 21.7 | 70.8 | 23.2 | −47 | — | — |
| Air outlet side (high-temperature | 88.2 | 73.9 | 20.9 | 70.2 | 11.8 | 15 | 43.3 | 37.2 |

TABLE 19-continued

| | Tensile strength (kg/mm²) | 0.2% Yield point (kg/mm²) | Elongation (%) | Reduction of area (%) | Impact value kg-m/cm² | Fatt (°C.) | $10^5$ hours Strength (kg/mm²) 450° C. | 475° C. |
|---|---|---|---|---|---|---|---|---|
| portion) | | | | | | | | |

Figure 7:
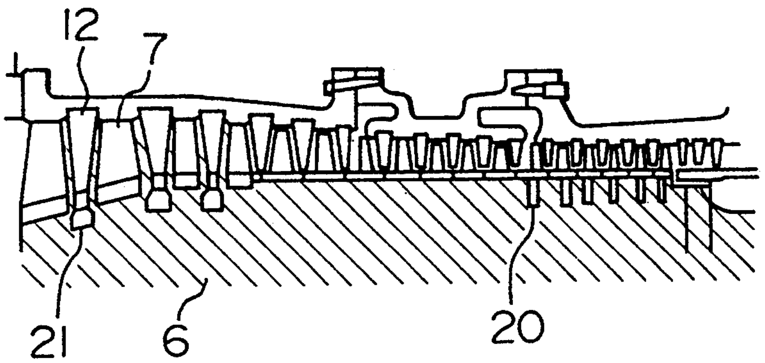
FIG. 7 is a cross-sectional view of a blade mounting portion of a rotor in the compressor according to the present invention.

As shown in FIG. 7, the blades from the first stage to the fourth stage are implanted or mounted in the same manner as that of the disk type rotor, while a cavity portion 20 is formed in the implanted portion of the rotor shaft from the twelfth stage to the last stage, unlike example 1.

Figure 8:
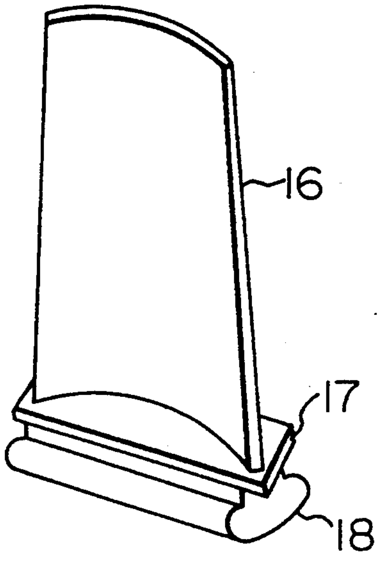
FIG. 8 is a perspective view of a blade of the compressor used up to the fourth stage constructed in accordance with the present invention.

In FIG. 8 the blade used up to the fourth stage is depicted with the implanted portion of the implanted blade being fixed by a spacer at both sides thereof.

The cavity portions 20 (FIG. 7) are provided to suppress an increase in temperature of the rotor shaft due to the compressed air heated to a high temperature at the last stage side and thereby reduce the temperature gradient due to a rapid increase in temperature of the rotor shaft.

Figure 9:
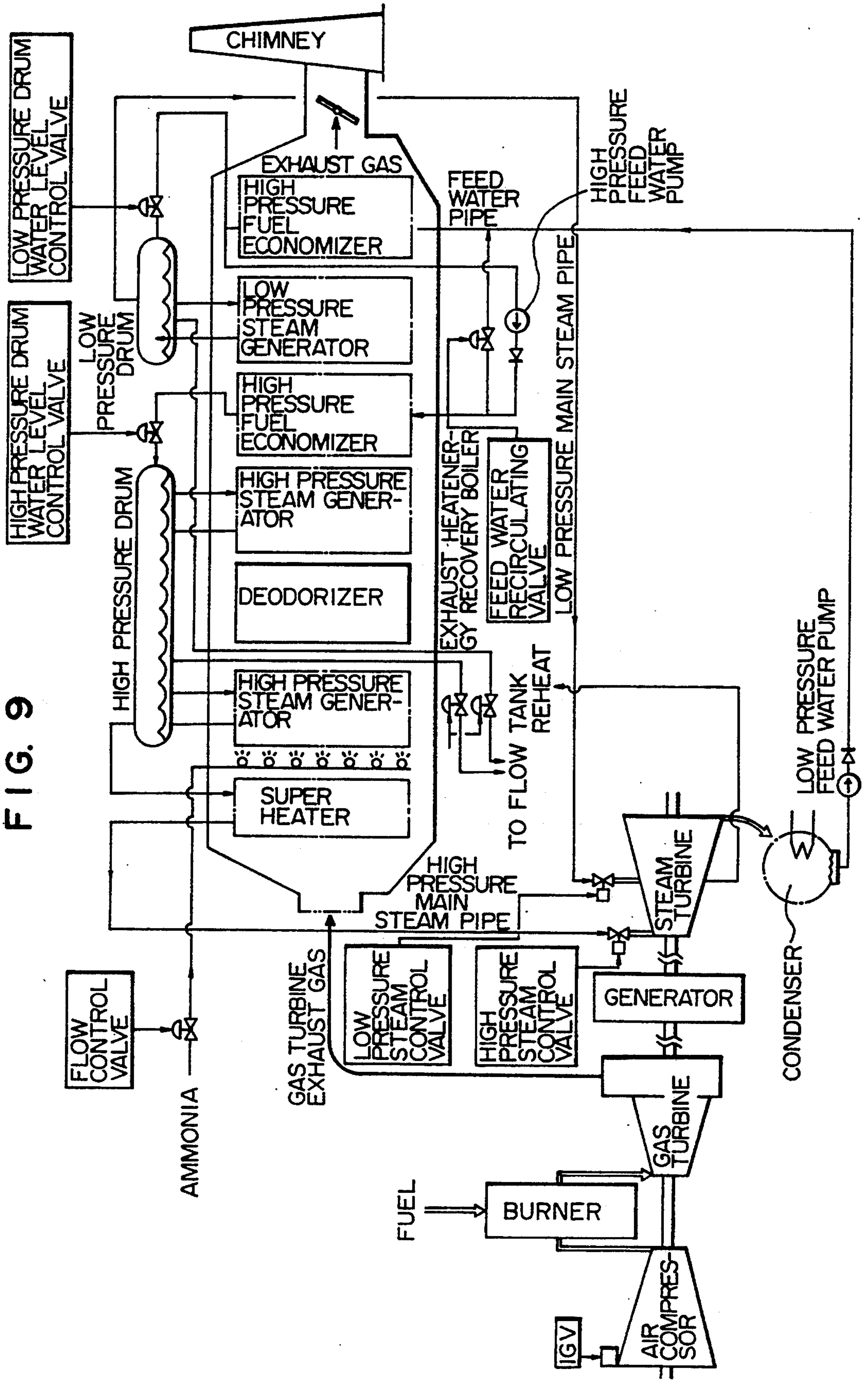
FIG. 9 is a schematical view of a uniaxial combined cycle power plant according to the present invention employing a gas turbine and a steam turbine.

It has been confirmed that the gas turbine of this example has excellent heat efficiency and facilitates maintenance. As shown in FIG. 9, the power plant of the present invention can employ a plurality of such gas turbines and a plurality of such steam turbines. For example, three gas turbines and three steam turbines or six gas turbines and six gas turbines may be employed.

In recent years, there is a tendency toward the use of a combined cycle power plant in which a generator is driven by both a gas turbine driven using liquefied natural gas (LNG) as a fuel and a steam turbine driven by the steam obtained by recovering the exhaust gas energy of the gas turbine. The use of such a combined cycle power plant can increase heat efficiency to 46% or above from 40% of heat efficiency obtained in a conventional power plant which employs a steam turbine alone.

As mentioned above, such a combined cycle power plant is generally of single fuel combustion type which employs liquefied natural gas (LNG). However, attempts have been made in recent years to use both liquefied natural gas (LNG) and liquefied petroleum gas (LPG) in such a power plant or to provide a fuel mixing combustion type power plant which employs both LNG and LPC to smooth the plant operation and to enhance economy.

First, air is taken into an air compressor of a gas turbine through a suction filter and then a suction silencer. The air compressor compresses the air and sends the compressed air to a low NOx combustor.

In the combustor, a fuel is injected into this compressed air and fired to generate a high-temperature gas having a temperature of 1400° C. or above. This generated high-temperature gas does a work in the gas turbine to generate a power.

The exhaust gas having a temperature of 550° C. or above and discharged from the gas turbine is supplied to an exhaust heat energy recovery steam generator (boiler) through an exhaust gas muffler device. The heat recovery steam generator recovers heat energy in the gas and sends a high pressure steam and a low pressure steam having a temperature of 530° C. or above to a steam turbine through a low-pressure steam pipe and a high-pressure steam pipe, respectively. The heat recovery steam generator includes a denitrating device of the type which employs the dry ammonia catalytic reduction method. The exhaust gas is discharged to the atmosphere from a tripod aggregation type chimney having a height of several hundreds of meters.

The generated high- and low-pressure steams are supplied to a steam turbine which includes a high-pressure rotor portion and low-pressure rotor portion of combined type rotor. The steam turbine will be described in detail hereinbelow.

The steam discharged from the steam turbine flows into a condenser. The water condensate generated by vacuum deaeration in the condenser passes through a condensate pump which increases the pressure of the condensate. The feed water from the condensate pump is sent to the heat recovery steam generator again. The generator is driven by both the gas turbine and the steam turbine at the respective shaft ends thereof to generate power. In order to cool the blades of the gas turbine used in such a combined cycle power plant, the steam utilized by the steam turbine may be used as a cooling medium, or alternatively an air is generally used as the cooling medium. Since the steam has a much higher specific heat than air and is light in weight, the use of steam is thus advantageous in cooling efficiency. Since the steam has the high specific heat, when it is discharged into a main stream of gas after cooling the turbine blade, a temperature of the main gas stream greatly reduces, thus reducing the efficiency of the entire plant. Hence, the steam in the steam turbine having a relatively low temperature (about 800° C.) is supplied though a cooling medium supply port of the gas turbine blade to cool a blade body, and the cooling medium heated to a relatively high temperature (about 900° C.) as a consequence of heat exchange is returned to the steam turbine. In this way manner, a reduction in temperature of the main stream of gas (which is between 1300° C. and 1550° C.) is prevented, and the efficiency of the steam turbine is improved, thus improving the efficiency of the entire plant. Such a combined cycle power plant can generate 90,000 KW of power in which about 60,000 KW is generated by the gas turbine and 30,000 KW is generated by the steam turbine. The steam turbine of this example is compact, and can thus be manufactured economically as compared with a large steam turbine having the same capacity. This allows for an economical operation of the plant when the generated power varies.

Any of the gas turbines described above can be employed. The air compressed by the compressor is supplied to the combustor to generate a combustion gas having a temperature of 1400° C. or above. The generated combustion gas rotates the disks with the blades implanted therein.

Figure 10:
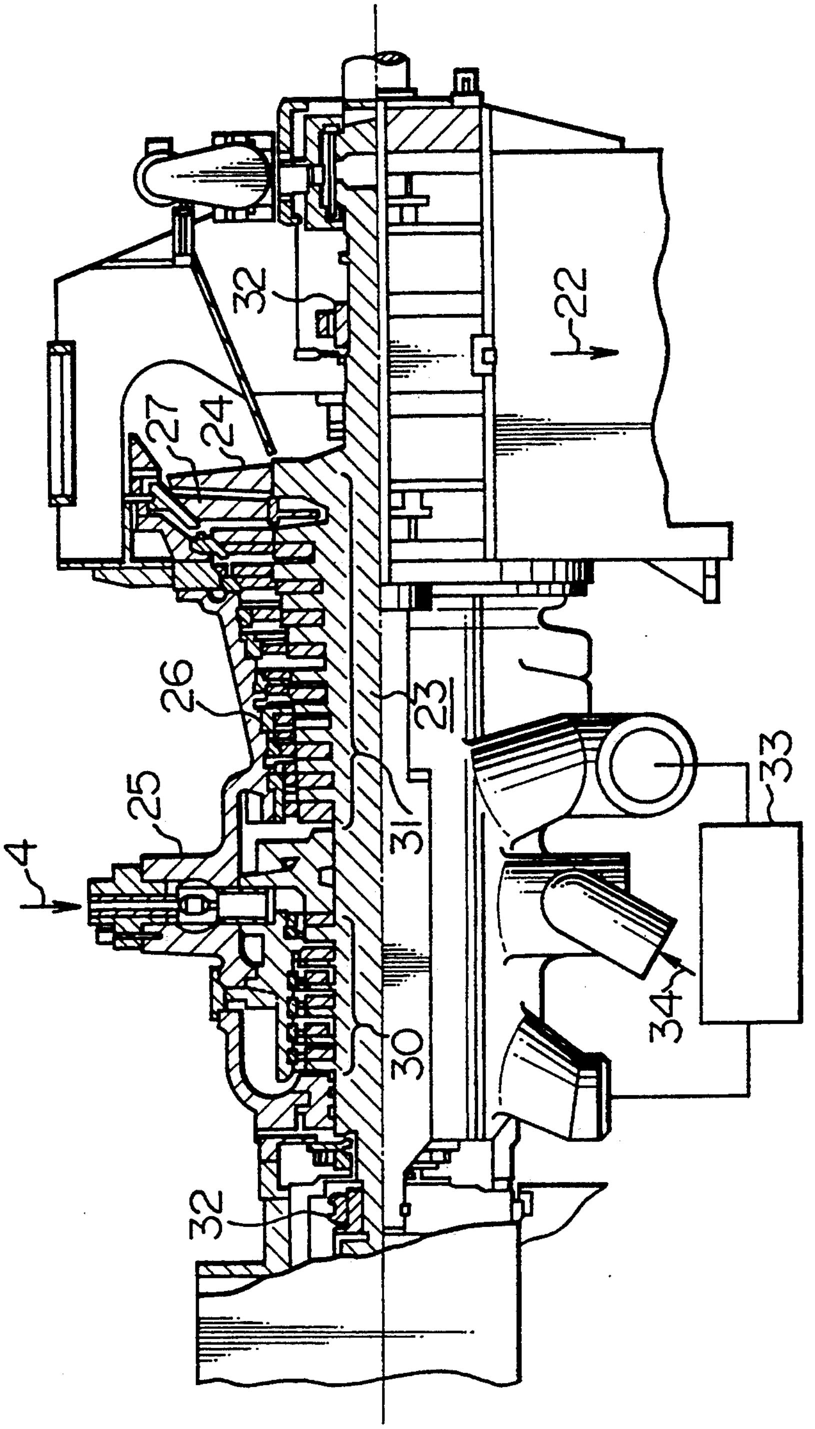
FIG. 10 is a cross-sectional view of part of a reheating time high- and low-pressure steam turbine according to the present invention.

With the construction of FIG. 10, the output of the single turbine can be increased by increasing the pressure and temperature of the steam at the main steam inlet of that high- and low-pressure steam turbine to 100 atg or above and 530° C. or above, respectively. To achieve an increase of the output of the single turbine, the length of the blade of the last stage and the steam flow rate must also be increased. An increase in the length of the blade of the last stage from, for example, 26 inches to 33.5 inches increases the annular area defined by the distal ends of the blades as viewed in the longitudinal direction of the steam turbine by a factor of 1.7, increasing the output of the single turbine from conventional 100 MW to 1700 MW. An increase in the length of the blade to 40 inches increases the output of the single turbine by a factor of 2.

In a steam turbine whose blade has a length of 33.5 inches or above, the high- and low-pressure rotor may be made of a Cr—Mo—V steel containing 0.5% Ni. Such a rotor material has been developed originally for a high-temperature portion. Thus, it has excellent high-temperature strength and creep characteristics, and can be used even when the pressure and temperature of the steam at the main steam inlet portion increases. In the case of a blade having a length of 26 inches, the tangential stress generated in a rated rotating state at the low-temperature portion, particularly, in the central hole of the turbine rotor portion corresponding to the blade of the last stage is about 0.95 in terms of the stress ratio (acting stress/allowable stress). In the case of a blade having a length of 33.5 inches, about 1.1 is obtained as the stress ratio. These indicate that the rotor material cannot be used for the low-temperature portion.

3.5% Ni—Cr—Mo—V steel may also be used as the rotor material. Since this rotor material has a toughness in the low-temperature area and hence has a tensile strength and proof stress higher than those of Cr—Mo—V steel by 14% in the low-temperature area, even when a blade having a length of 33.5 inches is used, the obtained stress ratio is about 0.96. In the case of a blade having a length of 40 inches, the stress ratio increases to 1.07, which means that the rotor material cannot be used for a low-temperature area. 3.5% Ni—Cr—Mo—V steel has a creep rupture stress which is about 0.3 times that of Cr—Mo—V steel, and thus cannot be used for the high-temperature area because of an insufficient high-temperature strength.

Hence, in order to achieve a high output, a rotor material which satisfies the excellent characteristics of Cr—Mo—V steel for a high-temperature area and excellent characteristics of Ni—Cr—Mo—V steel for a low-temperature area is required.

When a blade having a length of thirty inches or above, i.e., in the order of forty inches, is used, since the stress ratio is 1.07, as stated above, a material having a tensile strength of 88 kg/mm$^2$ or above is required. For a high- and low-pressure steam turbine rotor in which a blade of thirty-three inches or above is mounted, a material having a 538° C., $10^5$ h creep rupture strength of 15 kg/mm$^2$ or above is required from the viewpoint of prevention of high-temperature rupture at a high-pressure side. From the viewpoint of prevention of derusting at a low-pressure side, a material having a room temperature impact absorbing energy of 2.5 kg-m (3 kg-m/cm$^2$) is required.

In the steam turbine of this example, blades 24 of fifteen stages are implanted in a high-pressure rotor portion and low-pressure rotor portion of the combined rotor shaft 23. Steam which passes through a steam control valve 25 flows into a high-pressure portion 30 from a steam inlet 34 as a high-temperature, high-pressure steam of 538° C. and 126 atg. The steam flows out from the high-pressure portion 30 is a steam of 367° C. and 38 atg. This steam is re-heated to 538° C. and 35 atg by a re-heater 33 of the heat recovery steam generator. The re-heated steam passes through a low-pressure portion 31 of the rotor, and is discharged from an outlet 22 into the condenser as a steam of about 46° C. and 0.1 atg. Reference numeral 32 denotes a bearing.

Since the high-pressure rotor portion and low-pressure rotor portion combined rotor shaft 23 of this example is exposed to steam having a temperature ranging from 538° C. to 46° C., a forged steel of Ni—Cr—Mo—V low alloy, exhibiting FATT 60° C. or below, 538° C., $10^5$ h strength of 11 kg/mm$^2$ or above, is used to form the rotor shaft. The implanting portion of the rotor shaft 23 into which the blade 24 is implanted has a disk-like shape, and is manufactured by cutting the rotor shaft 23. As the length of the blade reduces, the length of the disk portion is reduced in order to lessen vibrations.

As the material of the rotor shaft 23 of this invention, an ingot was manufactured from an alloy steel having a composition shown in Table 4 by the electro slug remelting method. The obtained ingot was hot forged to a diameter of 1.2 m. After the ingot was heated at 950° C. for 10 hours, it was rotated and water spray cooled such that the central portion of the rotor shaft is cooled by a cooling speed 100° C./h. Next, tempering was conducted by retaining the shaft at 665° C. for 40 hours. A sample was cue out from the central portion of this rotor shaft. Creep rupture test, V notch impact test before and after heating (heating at 500° C. for 3000 hours)(the cross-sectional area of the sample was 0.8 cm$^2$) and tensile test were conducted on the sample.

(1) High-pressure rotor portion and low-pressure rotor portion combined rotor shaft In this example, a Ni—Cr—Mo—V low alloy steel having the substantially same composition and structure as those of the compressor rotor shaft material can be used as this turbine rotor shaft material. More preferably, this steel may have (Mn/Ni) weight percent ratio of 0.12 or below, or (Si+Mn)/Ni weight percent ratio of 0.18 or below. This steel may have (V+Mo)/(Ni+Cr) weight percent ratio ranging from 0.45 to 0.70. At least one of 0.04% (weight percent) or less rare earth element, 0.04% or less Mg, 0.04% or less Ca, 0.2% or less Hf, 0.2% or less Zr and 1% or less W may be added to that low alloy steel.

(2) Blade

Each of the blades for three stages on the high-temperature, high-pressure side has a length of about 40 mm, and is made of a martensitic forged steel whose composition comprises, in weight percent, 0.20–0.30% C, 10–13% Cr, 0.5–1.5% Mo, 0.5–1.5% W, 0.1–0.3% V, 0.5% or less Si, 1% or less Mn and the balance substantially of Fe.

The blades for intermediate pressure portion whose lengthes gradually increase toward the low pressure side are made of a martensitic forged steel whose composition comprises, in weight percent, 0.05–0.15% C, 1% or less Mn, 0.5% or less Si, 10–13% Cr, 0.5% or less Mo, 0.5% or less Ni and the balance substantially of Fe.

The blade of the last stage has a length of 33.5 inches, and is made of a martensitic forged steel whose composition comprises, in weight percent, 0.08–0.15% C, 1% or less Mn, 0.5% or less Si, 10–13% Cr, 1.5–3.5% Ni, 1–2% Mo, 0.2–0.5% V, 0.02–0.08% N and the balance substantially of Fe. There are about ninety blades over the periphery. On this last stage, an errosion-preventing shielding plate which is a stellite plane is provided at the leading edge of the dismal end thereof by welding. Besides the provision of the shielding plate, tempering is conducted partially on the last stage. As a blade having a length of 40 inches or above, Ti blade containing 5–8% Al and 3–6% V is used.

On each stage, four to five blades are fixed by a shroud plane made of the same material as that of the blades by caulking a protruding tenon provided at the distal end thereof.

To achieve 3000 rpm, 12% Cr steel is used for a blade having a length of 40 inches. For 3600 rpm, Ti blade is used as a blade having a length of 40 inches. A blade having a length up to 33.5 inches is made of 12% Cr steel.

(3) Stationary blades 27 of three stages on the high-pressure side are made of a martensitic steel having the substantially same composition as that of the moving blades. The stationary blades 27 of the other stages are made of the substantially same material as that of the moving blades on the intermediate pressure portion.

(4) A casing 26 is made of Cr—Mo—V cast steel whose composition comprises, in weight percent, 0.15–0.3% C, 0.5% or less Si, 1% or less Mn, 1–2% Cr, 0.5–1.5% Mo, 0.05–0.2% V, 0.1% or less Ti. Reference numeral 28 denotes a generator which can generate power of 100,000 to 200,000 KW. The length between the bearings 32 of the rotor shaft is about 520 cm. The outer diameter at the last stage blades is 316 cm. A rate of this outer diameter to the length between the bearings is 1.65. The plant capacity is 100,000 KW. The length between the bearings per 10,000 KW of plant capacity is 0.52 m.

In this example, the outer diameter, when the last stage blade having a length of forty inches is used, is 365 cm. The rate of the length between the bearings to this outer diameter is 1.43. With this arrangement, a plant capacity of 200,000 KW is obtained. The distance between the bearings per 10,000 KW is 0.26.

A rate of the outer diameter of the blade implanting portion of the rotor shaft to the length of the last stage blade is 1.70 in the case of a blade of 33.5", and is 1.71 in the case of a blade of 40".

In this example, the steam temperature may also be 566° C., and the steam pressure may be either 121, 169 or 224 atg.

The plane of this example is of uniaxial type which includes six pairs of power plants each power plant including a gas turbine, a heat recovery steam generator, a steam turbine and a generator. However, the plant may also be of multi-shaft type in which a single steam turbine is driven using a steam obtained by combinations of a plurality of gas turbines and corresponding heat recovery steam generators.

In a uniaxial type power plant, the gas turbine generates $\frac{2}{3}$ of the entire plant, output with the remaining $\frac{1}{3}$ generated by the steam turbine. A gas turbine which generates 50,000 KW to 200,000 KW of power can also be employed. In that case, a steam turbine corresponding to that output of the gas turbine is used.

The heat efficiency of the power plant can be increased by 2 to 3% from that of a conventional thermal power plant. Further, since the plant can be operated near the rated load which assures a high heat efficiency by reducing the number of gas turbines to be operated, the heat efficiency of the entire plant can be maintained to 46% or above. In addition, since the amount of $Co_2$ generated per unit plant capacity can be reduced, the plant can contribute to minimization of the earth warming trend.

The combined cycle power plant requires a short time to stop the operation thereof, and is made up of combinations of easy gas turbines and small and simple steam turbines. Therefore, the plant capacity of the power plant can be readily adjusted. This makes the power plant suitable as a middle load thermal power plant.

Since development of the technology has greatly increased reliability of the gas turbine and since the combined cycle power plant is made of up combinations of small-capacity machines, even if a failure occurs, it may affect only part of the plant, making the combined cycle power plant a reliable power source.

As will be understood from the foregoing description, in the present invention, loosening of the bolts due to creep thereof can be substantially eliminated as compared with a conventional divided type disk. Consequently, air having higher temperatures and higher pressure can be supplied to a combustor or a turbine to cool the same, enabling the temperature of the combustion gas to be increased to 1400° C. or above while making efficient cooling possible. As a result, the heat efficiency of the gas turbine can be increased, and a combined cycle power plant having a higher efficiency can be obtained.

What is claimed is:

1. A combined cycle power plant including a gas turbine rotated by a combustion gas, a heat recovery steam generator for generating a steam from a heat energy of the combustion gas exhausted from said gas turbine, a steam turbine rotated by the steam, and a generator means driven by said gas turbine and said steam turbine to generate an electric power, wherein said gas turbine has a compressor for compressing air, the compressor has a monolithic rotor structure made of Ni—Cr—Mo—V low alloy steel with a bainite structure, the rotor shaft has blades of at least fifteen stages implanted therein, a compression ratio of the compressed air is 15–20, a temperature of the compressed air is not less than 400° C., a temperature of the combustion gas at a combustor outlet is not less than 1400° C., a temperature of the exhausted combustion gas is between 550° and 600° C., said steam turbine has a single casing structure which contains a combined high-pressure portion and a low-pressure portion rotor shaft, and a temperature of the steam is not less than 530° C. with at least one of a thermal efficiency is not less than 46%, and a specific power is not less than 600 KW/(kg/S).

2. A combined cycle power plant including a gas turbine rotated by a combustion gas, a heat recovery steam generator for generating a steam from a heat energy of the combustion gas exhausted from said gas turbine, a steam turbine rotated by the steam, and generator means driven by said gas turbine and said steam turbine to generate an electric power, wherein said gas turbine includes a compressor having a monolithic rotor shaft of made of Ni—Cr—Mo—V low alloy steel with a bainite structure, and blades of 15 to 20 stages which are implanted in the monolithic rotor shaft, air is compressed by said compressor with a compression ratio of 15–20, a temperature of the compressed gas is not less than 400° C., said turbine rotated by the combustion gas has moving blades of three stages, a temperature of the combustion gas at a combustor outlet is not less than 1400° C., and a temperature of the exhausted combustion gas at an inlet of said heat recovery steam heat recovery steam generator is between 550° and 600° C., a temperature of the exhausted combustion gas at an outlet of said heat recovery steam generator is not more than 130° C., said steam turbine has a single casing structure which contains a combined high-pressure portion and a low-pressure portion rotor shaft and blades implanted in said rotor shaft, a size of the blade of a last stage is not less than 30 inches at a blade portion thereof, and a temperature of the steam at a high-pressure inlet of said steam turbine is not less than 530° C., while a temperature of the steam at a low pressure outlet of said steam turbine is not more than 100° C.

3. A combined cycle power plant including a gas turbine rotated by a combustion gas, a heat recovery steam generator for generating a steam from a heat energy of the combustion gas exhausted from said gas turbine, a steam turbine rotated by the steam, and a generator means driven by said gas turbine and said steam turbine to generate an electric power, wherein said gas turbine has a compressor for compressing air, a compression ratio of the compressed air is 15–20, a temperature of the compressed air is not less than 400° C., a temperature of the combustion gas at the combustor outlet is not less than 1400° C., a temperature of the exhausted combustion gas is between 550° and 600° C. said steam turbine having a single casing structure which contains a combined high pressure portion and low pressure portion rotor shaft, and a temperature of the steam is not less than 530° C., with at least one of a thermal efficiency being not less than 45% and a specific power not less than 600 kW/(kg/S), said compressor has a monolithic rotor shaft and blades implanted in said rotor shaft, said rotor shaft is made of a Ni—Cr—Mo—V low alloy steel, a 50% fracture appearance transition temperature thereof is not more than 20° C. and a $10^5$ hours of creep rupture strength under 475° C. is not less than 30 $kg/mm^2$.

4. A combined cycle power plant including a gas turbine rotated by a combustion gas, a heat recovery steam generator for generating a steam from heat energy of the combustion gas exhausted from said gas turbine, a steam turbine rotated by the steam, and generator means driven by said gas turbine and said steam turbine to generate electric power, wherein said gas turbine includes a compressor for compressing air, a compression ratio of the compressed air is 15–20, a temperature of the compressed air is not less than 400° C., a temperature of the combustion gas at the combustor outlet is not less than 1400° C., a temperature of the exhausted combustion gas is between 550° and 600° C., said steam turbine has a single casing structure which contains a combined high pressure portion and low pressure portion rotor shaft, and a temperature of the steam is not less than 530° C., with at least one of a thermal efficiency being not less than 46% and a specific power not being less than 600 kW/(kg/S), said compressor has a monolithic rotor shaft and blades implanted in said rotor shaft, said rotor shaft is made of a Ni—Cr—Mo—V type low alloy steel having substantially an entire bainite microstructure which comprises, in weight percent, C of 0.15–0.40%, Si not more than 0.1%, Mn not more than 0.5%, Ni of 1.5–2.5%, Cr of 0.8–2.5%, Mo of 0.8–2.0%, V of 0.1–0.35% and the balance being substantially Fe.

5. A combined cycle power plant according to claim 4, wherein the Ni—Cr—Mo—V type low alloy steel further comprises, in weight percent, Co not more than 0.15%, W not more than 0.5%, B not more than 0.01%, Al not more than 0.1%, Ti not more than 0.3%, Zr not more than 0.1%, Hf not more than 0.1%, Ca not more than 0.01%, Mg not more than 0.01%, Y not more than 0.01%, and at least one rare-earth element not more than 0.01%.

6. A combined cycle power plant including a gas turbine rotated by a combustion gas, a heat recovery steam generator for generating a steam from a heat energy of the combustion gas exhausted from said gas turbine, a steam turbine rotated by the steam, and generator means driven by said gas turbine and said steam turbine to generate an electric power, wherein said gas turbine includes a compressor having a monolithic rotor structure and blades of 15–20 stages which are implanted in the monolithic rotor structure, air is compressed by said compressor with a compression ratio of 15–20, a temperature of the compressed gas is not less than 400° C., said turbine rotated by the combustion gas has moving blades of three stages, a temperature of the combustion gas at a combustor outlet is not less than 1400° C., a temperature of the exhausted combustion gas at an inlet of said heat recovery steam generator is between 550° and 600° C., a temperature of the exhausted combustion gas at an outlet of said heat recovery steam generator is not more than 130° C. said steam turbine has a single casing structure which contains a combined high pressure portion and low pressure portion rotor shaft, and blades implanted in said rotor shaft, a size of the blade of a last stage is not less than 30″ at a blade portion thereof, and a temperature of the steam at a high-pressure inlet of said steam turbine is not less than 530° C., while a temperature of the steam at a low pressure outlet of said steam turbine is not more than 100° C., said rotor shaft is made of Ni—Cr—Mo—V low alloy steel, a 50% fracture appearance transition temperature thereof is not more than 20° C. and a $10^5$ hours of creep rupture strength under 475° C. is not less than 30 $kg/mm^2$.

7. A combined cycle power plant including a gas turbine rotated by a combustion gas, a heat recovery steam generator for generating a steam from a heat energy of the combustion gas exhausted from said gas turbine, a steam turbine rotated by the steam, and generator means driven by said gas turbine and said steam turbine to generate an electric power, wherein said gas turbine includes a compressor having a monolithic rotor shaft and blades of 15–20 stages which are implanted in the monolithic rotor shaft, air is compressed by said compressor with a compression ratio of 15–20, a temperature of the compressed air is not less than 400° C., said turbine rotated by the combustion gas has moving blades of three stages, a temperature of the combustion gas at the combustor outlet is not less than 1400° C., and a temperature of the exhausted combustion gas at an inlet of said heat recovery steam generator is between 550° and 600° C., a temperature of the exhausted combustion gas at an outlet of said heat recovery steam generator is not more than 130° C., said steam turbine has a single casing structure which contains a combined high pressure portion and low pressure portion rotor shaft, and blades implanted in said rotor shaft, a size of the blade of a last stage is not less than 30″ at a blade portion thereof, and a temperature of the steam at a high-pressure inlet of said steam turbine is not less than 530° C., while a temperature of the steam at a low pressure outlet of said steam turbine is not more than 100° C. said rotor shaft is made of Ni—Cr—Mo—V type low alloy steel having substantially entirely a bainite microstructure which comprises in weight percent, C of 0.15–0.40%, Si not more than 0.1%, Mn not more than 0.5%, Ni of 1.5–2.5%, Cr of 0.8–2.5%, Mo of 0.8–2.0%, V of 0.1–0.35% and the balance being substantially Fe.

8. A combined cycle power plant according to claim 7, wherein the Ni—Cr—Mo—V type low alloy steel further comprises, in weight percent, Co not more than 0.15%, W not more than 0.5%, B not more than 0.01%, Al not more than 0.1%, Ti not more than 0.3%, Zr not more than 0.1%, Hf not more than 0.1%, Ca not more than 0.01%, Mg not more than 0.01%, Y not more than 0.01%, and at least one rare-earth element not more than 0.01%.

* * * * *